(12) United States Patent
Sun et al.

(10) Patent No.: US 8,919,119 B2
(45) Date of Patent: Dec. 30, 2014

(54) SLIDING VANE GEOMETRY TURBINES

(75) Inventors: Harold Huimin Sun, West Bloomfield, MI (US); Jizhong Zhang, West Bloomfield, MI (US); Liangjun Hu, West Bloomfield, MI (US); Dave R. Hanna, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 210 days.

(21) Appl. No.: 13/210,907

(22) Filed: Aug. 16, 2011

(65) Prior Publication Data
US 2013/0042608 A1 Feb. 21, 2013

(51) Int. Cl.
F02D 23/00 (2006.01)
F04D 29/00 (2006.01)
F04D 29/56 (2006.01)
F02B 37/24 (2006.01)
F01D 17/16 (2006.01)

(52) U.S. Cl.
CPC .............. *F02B 37/24* (2013.01); *F01D 17/167* (2013.01); *F05D 2220/40* (2013.01); *F05D 2230/90* (2013.01); *F05D 2240/12* (2013.01); *F05D 2300/20* (2013.01); *Y02T 10/144* (2013.01)
USPC .......... 60/602; 415/209.3; 415/148; 415/159; 415/161

(58) Field of Classification Search
CPC .......... F01D 17/14; F01D 11/00; F02B 37/22
USPC ......... 60/602; 415/209.3, 148, 115, 116, 159, 415/161
See application file for complete search history.

(56) References Cited

U.S. PATENT DOCUMENTS

| | | | | |
|---|---|---|---|---|
| 3,966,353 A | * | 6/1976 | Booher et al. | 415/115 |
| 3,992,128 A | * | 11/1976 | Lunsford et al. | 415/161 |
| 4,355,953 A | * | 10/1982 | Nelson | 415/164 |
| 4,705,452 A | * | 11/1987 | Karadimas | 415/115 |
| 4,741,666 A | | 5/1988 | Shimizu et al. | |
| 6,158,956 A | | 12/2000 | Arnold | |
| 6,419,464 B1 | | 7/2002 | Arnold | |
| 6,692,406 B2 | * | 2/2004 | Beaty | 477/32 |
| 7,137,778 B2 | | 11/2006 | Marcis et al. | |
| 7,255,530 B2 | * | 8/2007 | Vogiatzis et al. | 415/159 |
| 7,305,826 B2 | * | 12/2007 | Kuster | 60/602 |
| 7,458,764 B2 | * | 12/2008 | Lombard et al. | 415/1 |
| 7,478,991 B2 | * | 1/2009 | Noelle | 415/159 |
| 7,670,107 B2 | * | 3/2010 | Barthelet et al. | 415/160 |
| 8,231,326 B2 | * | 7/2012 | Mariotti et al. | 415/162 |

(Continued)

FOREIGN PATENT DOCUMENTS

WO 20071045874 A1 4/2007
WO WO 2011042696 A2 * 4/2011

*Primary Examiner* — Thai Ba Trieu
*Assistant Examiner* — Shhafiq Mian
(74) *Attorney, Agent, or Firm* — Julia Voutyras; Alleman Hall McCoy Russell & Tuttle LLP

(57) ABSTRACT

Various systems and methods are described for a variable geometry turbine. In one example, a turbine nozzle comprises a central axis and a nozzle vane. The nozzle vane includes a stationary vane and a sliding vane. The sliding vane is positioned to slide in a direction substantially tangent to an inner circumference of the turbine nozzle and in contact with the stationary vane.

20 Claims, 6 Drawing Sheets

(56) References Cited

U.S. PATENT DOCUMENTS

| | | | |
|---|---|---|---|
| 2006/0233640 A1* | 10/2006 | Lombard et al. | 415/159 |
| 2008/0152484 A1* | 6/2008 | Fledersbacher et al. | 415/148 |
| 2010/0196145 A1* | 8/2010 | Lombard et al. | 415/148 |
| 2011/0110767 A1* | 5/2011 | Castan et al. | 415/159 |
| 2011/0113773 A1* | 5/2011 | Liu et al. | 60/602 |
| 2011/0182715 A1* | 7/2011 | Leithead et al. | 415/148 |
| 2012/0082539 A1* | 4/2012 | Mohiki | 415/159 |
| 2013/0078082 A1* | 3/2013 | Arnold et al. | 415/159 |

* cited by examiner

SLIDING VANE GEOMETRY TURBINES

GOVERNMENT RIGHTS

This invention was made with government support under DE-FC26-07NT43280 awarded by the Department of Energy. The government has certain rights in the invention.

FIELD

The present application relates to variable geometry turbines for turbochargers of internal combustion engines.

BACKGROUND AND SUMMARY

Engines may use a turbocharger to improve engine torque and/or power output density. In one example, a turbocharger may include a compressor and a turbine connected by a drive shaft, where the turbine receives exhaust gasses and the compressor receives intake air. In this way, the exhaust-driven turbine supplies energy to the compressor to boost the pressure and flow of air into the engine. For example, boost pressure may be increased by increasing the rotational speed of the turbine. The desired amount of boost may vary over operation of the engine. For example, the desired boost may be greater during acceleration than during deceleration.

One solution to control the boost pressure is a variable geometry turbine. A variable geometry turbine controls boost pressure by varying the flow of exhaust gas through the turbine. For example, exhaust gas may flow from the exhaust manifold through a turbine nozzle and to the turbine blades. The geometry of the turbine nozzle may be varied to control the angle that exhaust gas strikes the turbine blades and/or to vary the cross-sectional area of channels upstream of the turbine blades. Increasing the cross-sectional area of the channels may allow more gas to flow through the channels, but the gas may flow slower compared to gas flowing through a channel with smaller cross-sectional area. The angle of incidence of gas flowing across the turbine blades may affect the efficiency of the turbine, e.g. the amount of thermodynamic energy captured from the flow that is converted to mechanical energy. Thus, the turbine speed and boost pressure may be varied by changing the geometry of the turbine nozzle.

One type of variable geometry turbine includes a swing nozzle vane that pivots within the turbine nozzle. Exhaust gas flowing through the turbine nozzle flows through channels formed between the swing nozzle vanes. Pivoting the vanes in one direction increases the cross-sectional area of channels upstream of the turbine and decreases the incident angle of gas flowing across the turbine blade. Pivoting the vanes in the other direction decreases the cross-sectional area of channels upstream of the turbine and increases the incident angle of gas flowing across the turbine blade. Thus, the swing nozzle vane creates a trade-off between turbine efficiency at high exhaust gas flows or at low exhaust gas flows because the cross-sectional area of the channels and the angle of incidence cannot be varied independently.

Another type of variable geometry turbine uses an annular sliding ring that slides axially in the turbine housing to vary the cross-section of the channels in the turbine nozzle. Thus, an efficient angle of incidence can be maintained over the engine operating range. However, the turbine inlet, at the interface between the turbine nozzle outlet and the turbine blades, is sized for large exhaust flows of the engine. At small exhaust flows, the turbine nozzle channels have a decreased cross-section and energy is lost when the exhaust gas expands from the small turbine nozzle channel to the larger turbine inlet.

The inventors herein have recognized the above issues and have devised an approach to at least partially address them. In one example, an annular turbine nozzle comprises a central axis and a nozzle vane. The nozzle vane includes a stationary vane and a sliding vane. The stationary vane includes a sliding surface in contact with a sliding surface of the sliding vane. The sliding vane is positioned to slide in a direction substantially tangent to an inner circumference of the turbine nozzle. Thus, a desired angle of incidence may be substantially maintained over a range of engine operating conditions. Further, expansion losses may be reduced as compared to a turbine nozzle with an annular sliding ring.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

At least FIGS. 3-4 are approximately to scale.

DETAILED DESCRIPTION

Figure 1:
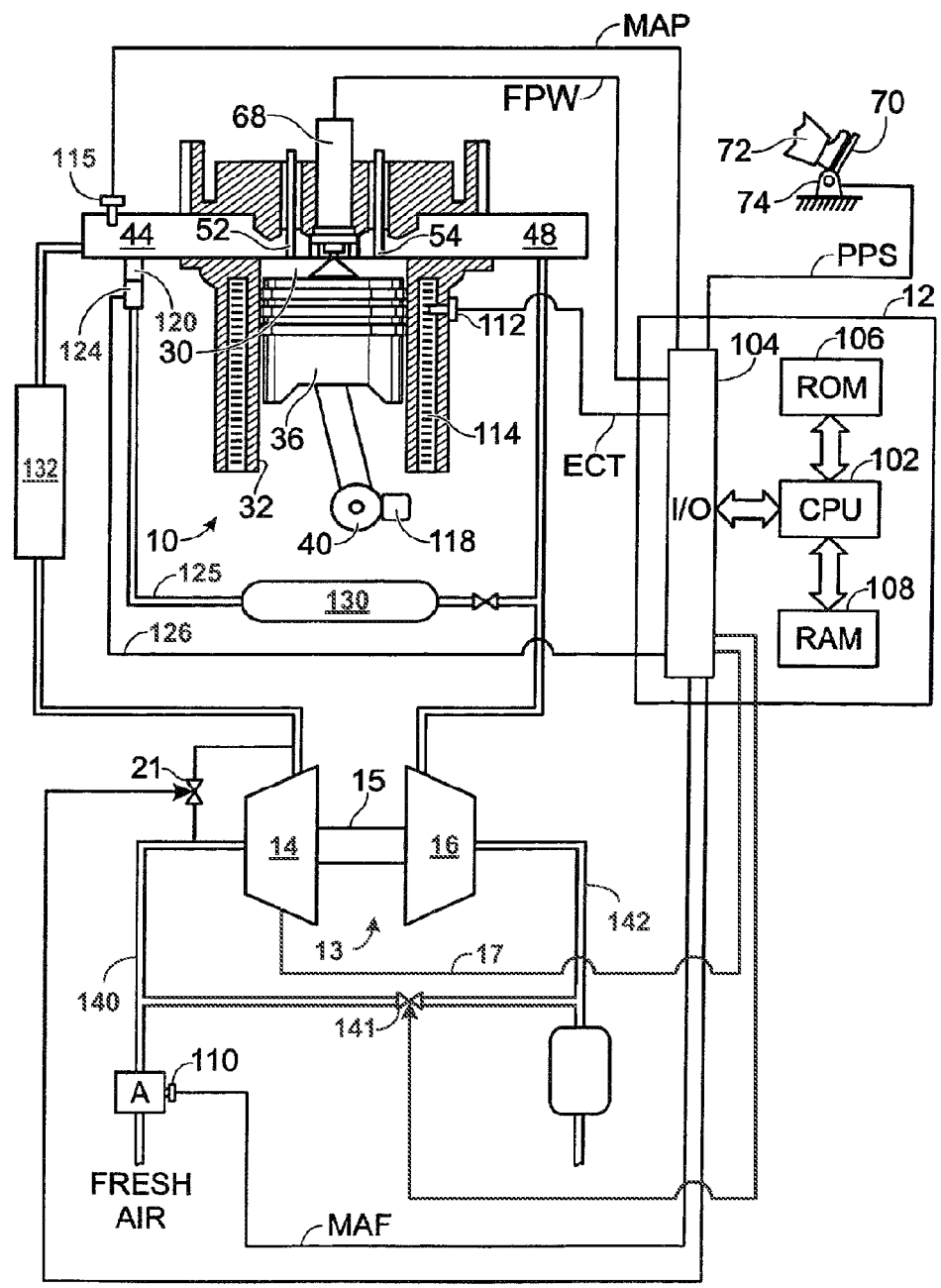
FIG. 1 shows an example embodiment of a turbocharged engine.
Figure 3:
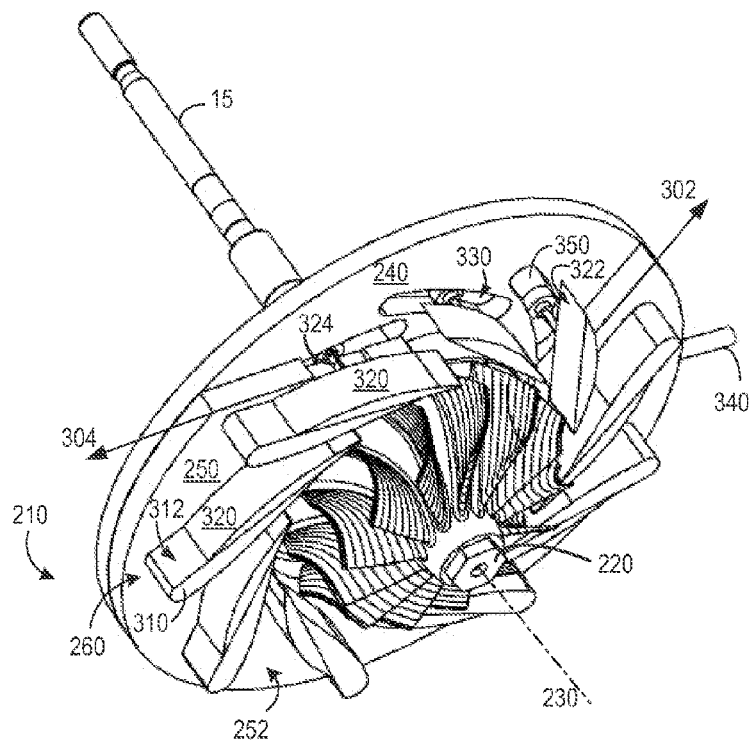
FIG. 3 shows a perspective view of an example embodiment of a turbine nozzle and a turbine wheel.
Figure 4:
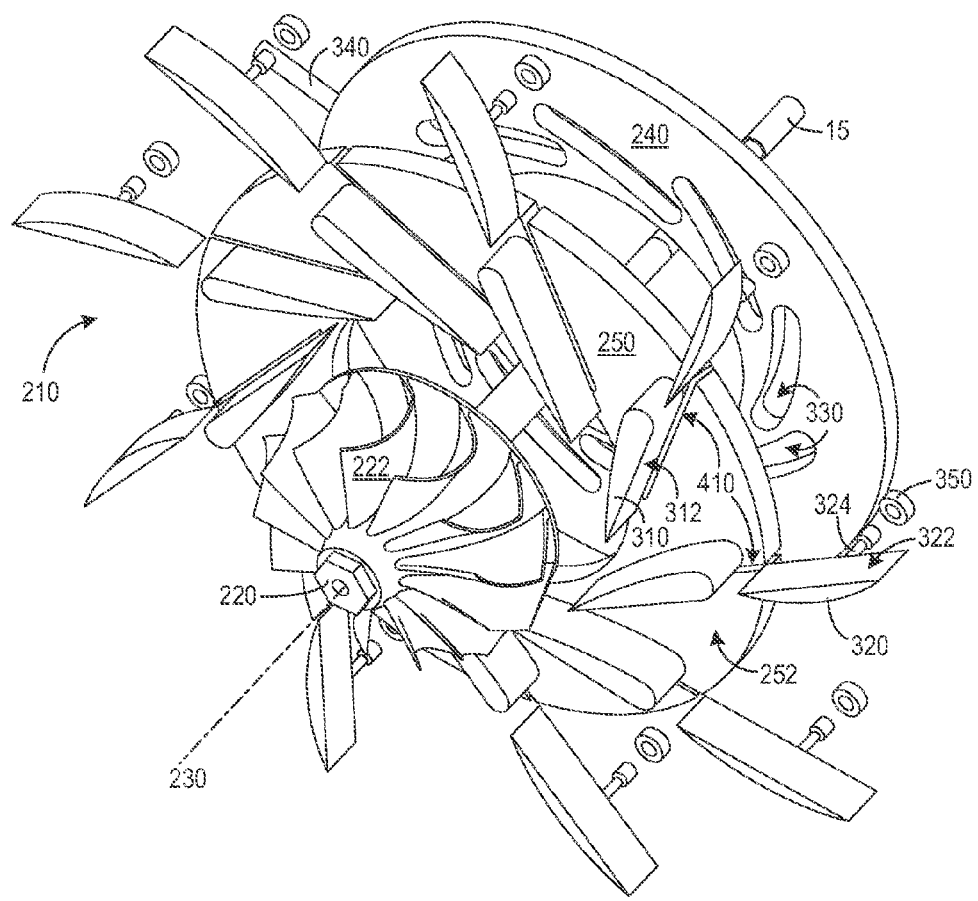
FIG. 4 shows an exploded view of an example embodiment of a turbine nozzle.
Figure 5:
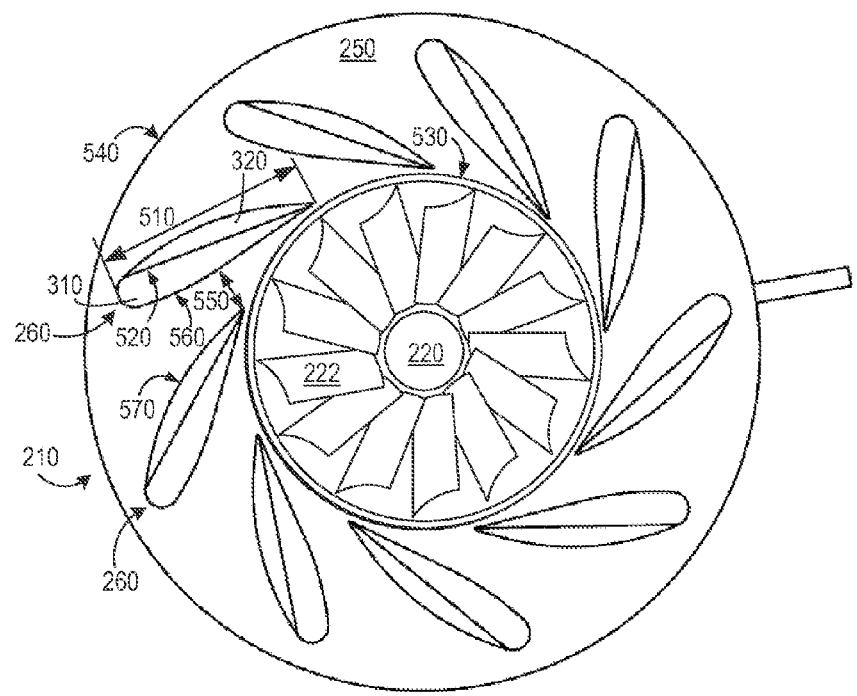
FIG. 5 shows an example embodiment of a turbine nozzle having a sliding nozzle vane when the sliding nozzle vane is adjusted for a first engine operating condition.
Figure 6:
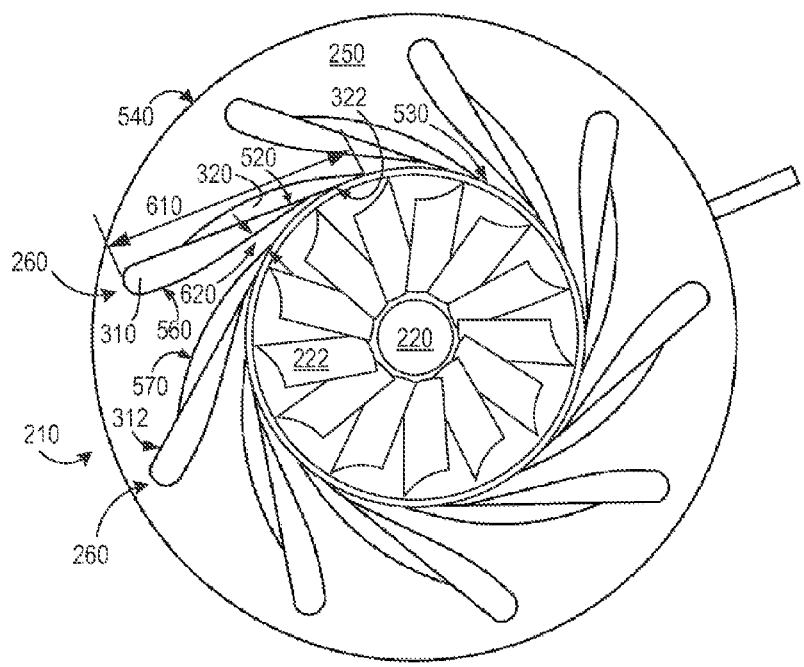
FIG. 6 shows an example embodiment of a turbine nozzle when the sliding nozzle vane is adjusted for a second engine operating condition.
Figure 7:
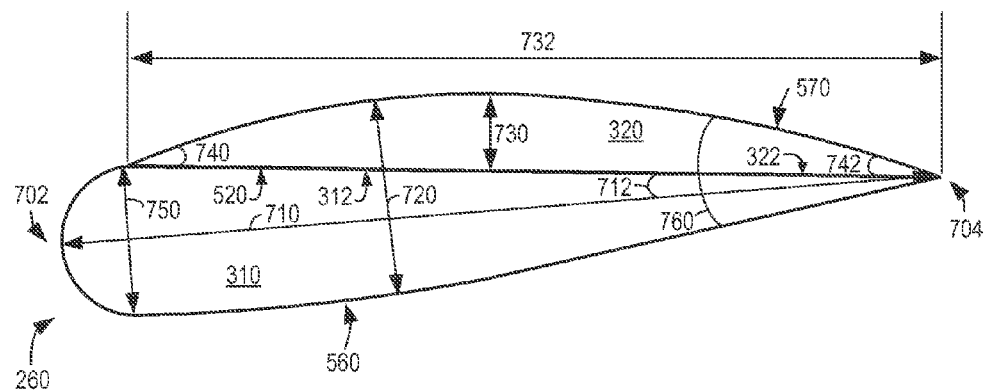
FIGS. 7 and 8 show an example embodiment of a nozzle vane adjusted for different engine operating conditions.
Figure 8:
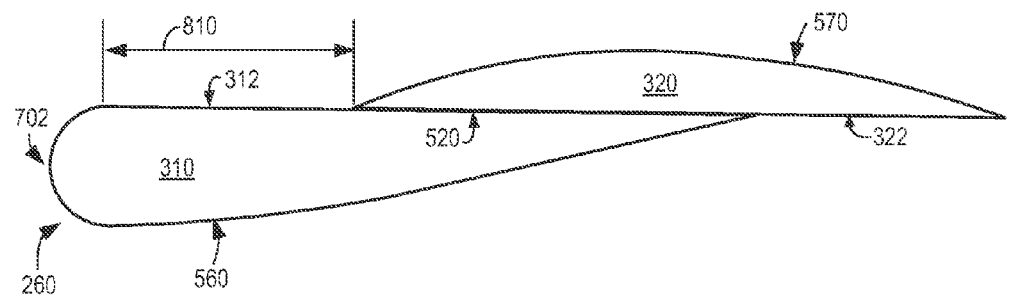
Figure 9:
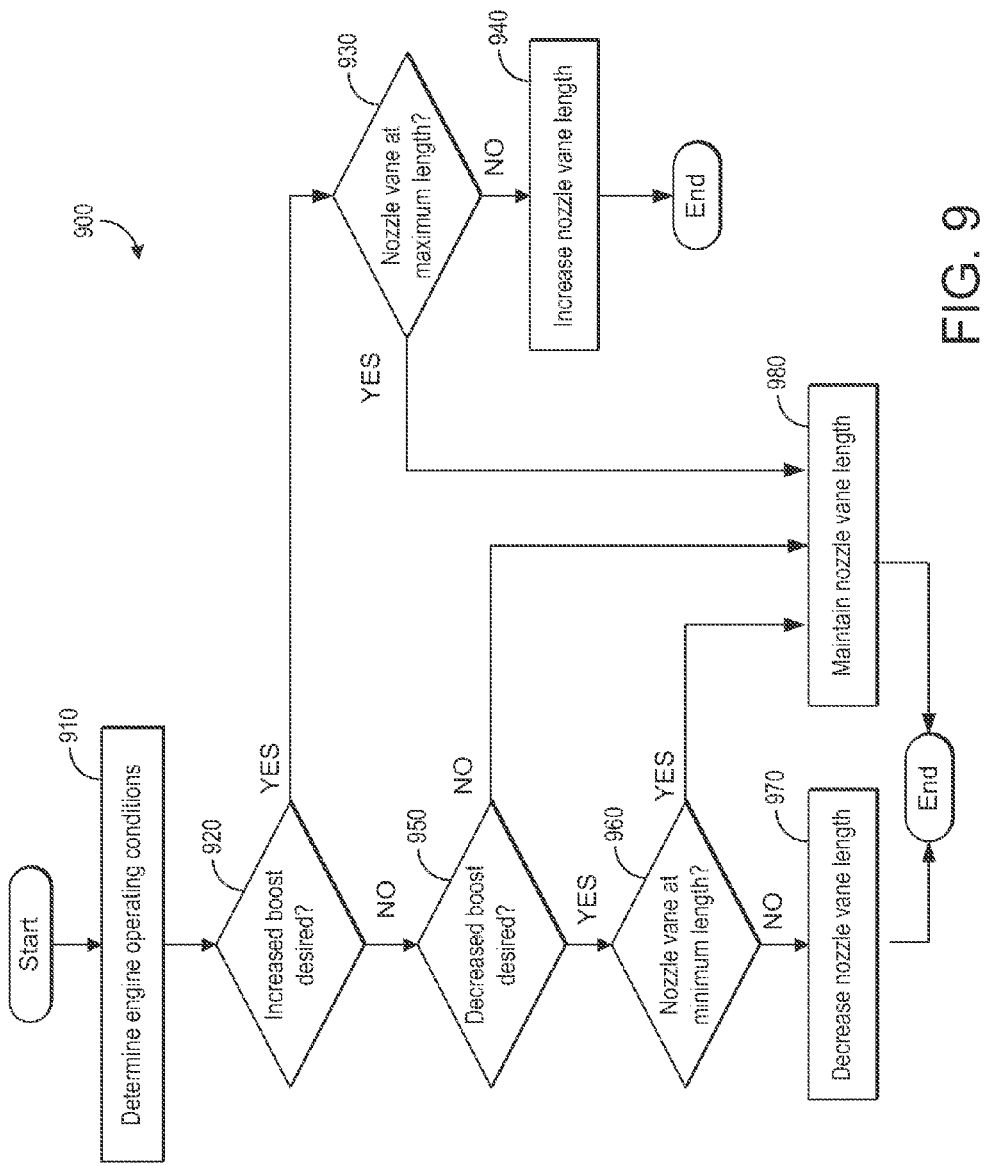
FIG. 9 shows an example embodiment of a method for a turbocharged engine including a sliding nozzle vane.

The following description relates to systems for variable geometry turbochargers of internal combustion engines. An example embodiment of an engine with a turbocharger is illustrated in FIG. 1. The example turbocharger includes a compressor driven by a turbine, such as the example embodiment of a turbine illustrated in FIG. 2. The example turbine includes a turbine nozzle and a turbine wheel, such as shown in more detail in FIGS. 3-6. FIG. 3 shows a perspective view of an example embodiment of a turbine nozzle and a turbine wheel. FIG. 4 shows an exploded view of an example embodiment of a turbine nozzle. FIGS. 5 and 6 show how a sliding nozzle vane of the turbine nozzle may be varied during different engine operating conditions. For example, decreasing the length of the sliding nozzle vane, as illustrated in FIG. 5, may be desirable when the engine is generating a large exhaust flow. As another example, increasing the length of the sliding nozzle vane, as illustrated in FIG. 6, may be desirable when the engine is generating a small exhaust flow. By varying the length of the nozzle vane over different engine operating conditions, the boost pressure of the engine may be controlled. FIGS. 7 and 8 show an example embodiment of a nozzle vane so that various vane characteristics may be defined. For example, FIG. 7 shows the nozzle vane adjusted to a first length and FIG. 8 shows the nozzle vane adjusted to a second length. FIG. 9 shows an example embodiment of a method for a turbocharged engine including a sliding nozzle vane. For example, the example method illustrates how the boost pressure may be controlled by varying the length of the nozzle vane.

FIG. 1 shows an example of a turbocharged engine. Specifically, internal combustion engine 10, comprising a plurality of cylinders, one cylinder of which is shown in FIG. 1. Engine 10 may be controlled at least partially by a control system including controller 12 and by input from a vehicle operator 72 via an input device 70. In this example, input device 70 includes an accelerator pedal and a pedal position sensor 74 for generating a proportional pedal position signal PPS. Engine 10 includes combustion chamber 30 and cylinder walls 32 with piston 36 positioned therein and connected to crankshaft 40. Combustion chamber 30 communicates with intake manifold 44 and exhaust manifold 48 via respective intake valve 52 and exhaust valve 54. Intake manifold 44 is also shown having fuel injector 68 coupled thereto for delivering fuel in proportion to the pulse width of signal (FPW) from controller 12.

Controller 12 is shown as a microcomputer, including microprocessor unit 102, input/output ports 104, an electronic storage medium for executable programs and calibration values shown as read only memory chip 106 in this particular example, random access memory 108, and a conventional data bus.

Controller 12 receives various signals from sensors coupled to engine 10, including but not limited to: measurements of inducted mass air flow (MAF) from mass air flow sensor 110 coupled to the air filter; engine coolant temperature (ECT) from temperature sensor 112 coupled to cooling sleeve 114; a measurement of manifold pressure (MAP) from manifold pressure sensor 115 coupled to intake manifold 44; and a profile ignition pick up signal (PIP) from Hall effect sensor 118 coupled to crankshaft 40 indicating an engine speed.

In a configuration known as high pressure EGR, exhaust gas is delivered to intake manifold 44 by EGR tube 125 communicating with exhaust manifold 48. EGR valve assembly 120 is located in EGR tube 125. Stated another way, exhaust gas travels from exhaust manifold 48 first through valve assembly 120, then to intake manifold 44. EGR valve assembly 120 can then be said to be located upstream of the intake manifold. There is also an optional EGR cooler 130 placed in EGR tube 125 to cool EGR before entering the intake manifold. Low pressure EGR may be used for recirculating exhaust gas from downstream of turbine 16 to upstream of compressor 14 via valve 141.

Pressure sensor 115 provides a measurement of manifold pressure (MAP) to controller 12. EGR valve assembly 120 has a valve position (not shown) for controlling a variable area restriction in EGR tube 125, which thereby controls EGR flow. EGR valve assembly 120 can either minimally restrict EGR flow through tube 125 or completely restrict EGR flow through tube 125, or operate to variably restrict EGR flow. Vacuum regulator 124 is coupled to EGR valve assembly 120. Vacuum regulator 124 receives actuation signal 126 from controller 12 for controlling valve position of EGR valve assembly 120. In one embodiment, EGR valve assembly is a vacuum actuated valve. However, any type of flow control valve may be used, such as, for example, an electrical solenoid powered valve or a stepper motor powered valve.

Turbocharger 13 has a turbine 16 coupled to exhaust manifold 48 and a compressor 14 coupled in the intake manifold 44 via an intercooler 132. Turbine 16 is coupled to compressor 14 via drive shaft 15. Air at atmospheric pressure enters compressor 14 from passage 140. Exhaust gas flows from exhaust manifold 48, through turbine 16, and exits passage 142. In this manner, the exhaust-driven turbine supplies energy to the compressor to boost the pressure and flow of air into the engine. The boost pressure may be controlled by the rotational speed of turbine 16 which is at least partially controlled by the flow of gasses through turbine 16.

Figure 2:
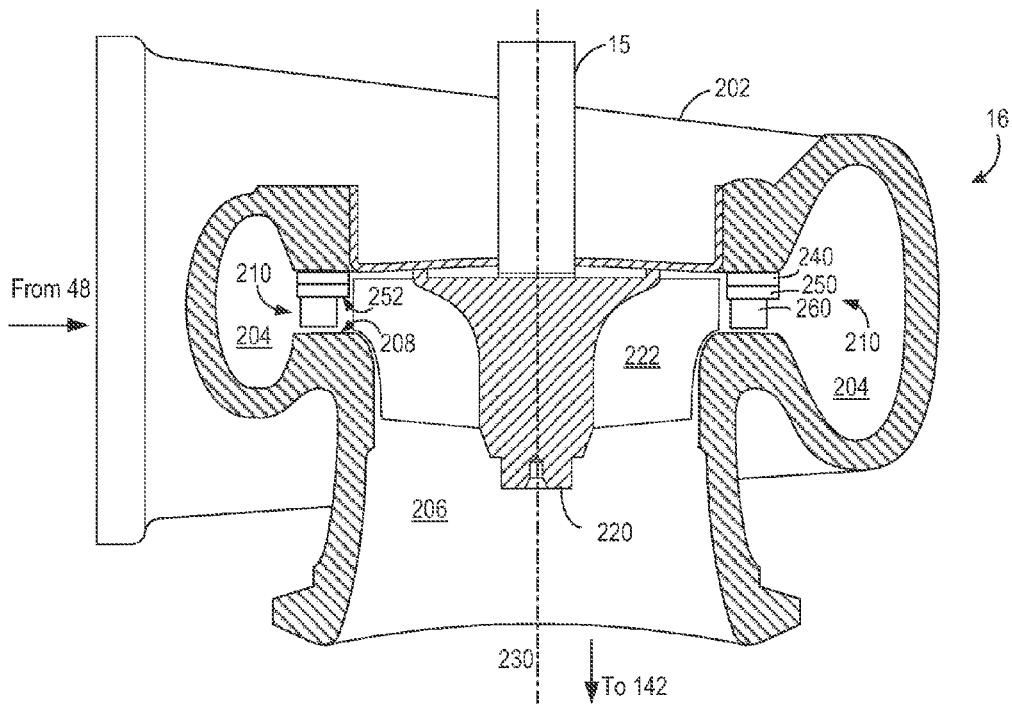
FIG. 2 shows a cross-section of an example embodiment of a turbocharger turbine including a turbine nozzle.

The flow of gasses through turbine 16 may be further illustrated by the example embodiment of turbine 16 in FIG. 2. Turbine 16 may include a housing 202 that encloses a turbine nozzle 210 and a turbine wheel 220 having a turbine blade 222. For example, housing 202 may include a passage 204 in communication with annular turbine nozzle 210. Turbine nozzle 210 may be in communication with passage 206. Thus, exhaust gas may flow from exhaust manifold 48, through passage 204, through turbine nozzle 210, across turbine wheel 220 and turbine blade 222 into passage 206, and out to passage 142. Further, the flow of gasses, e.g. the expansion of gasses, through turbine 16 may be controlled by varying the geometry of turbine nozzle 210, and thus, the rotational speed of turbine 16 may be controlled.

For example, the geometry of a nozzle vane 260 may be adjusted to control the flow of gasses through turbine nozzle 210. In one example, the length of nozzle vane 260 may be adjusted to control the flow of gasses through turbine nozzle 210. In one embodiment, turbine nozzle 210 may be generally annular and share a central axis 230 with turbine wheel 220 and drive shaft 15. In other words, turbine wheel 220 and turbine nozzle 210 may be coaxial and concentric. Turbine nozzle 210 may include an annular unison ring 240, an annular nozzle wall plate 250, and nozzle vane 260. In one embodiment, unison ring 240 and nozzle wall plate 250 may form a support and control structure for nozzle vane 260. For example, the shape of nozzle vane 260 may be adjusted by rotating one or both of unison ring 240 and nozzle wall plate 250.

Varying the geometry of nozzle vane 260 may vary the cross-sectional area of a channel, or throat, of turbine nozzle 210. In one embodiment, a channel may include four sides. For example, one side may be formed by a surface 252 of nozzle wall plate 250 and one side may be formed by a surface 208 of turbine housing 202. The other two sides may be formed by surfaces of adjacent nozzle vanes. In one embodiment, the distance between nozzle wall plate 250 and turbine housing 202 cannot be varied during engine operation, e.g. there is no axial movement of nozzle wall plate 250 relative to turbine housing 202, so the cross-sectional area of the turbine nozzle channels are controlled only by adjusting nozzle vane 260. For example, lengthening nozzle vane 260 may adjust the cross-sectional area of channels of turbine nozzle 210 and the volumetric flow of gas through the channels. In an alternate embodiment, axial movement of one or both of nozzle wall plate 250 and turbine housing 202 may further be used to vary the cross-sectional area of channels of turbine nozzle 210.

The geometry and adjustment of nozzle vane 260 may be further illustrated by FIG. 3. FIG. 3 shows a perspective view of an example embodiment of a turbine nozzle and a turbine wheel, where part of nozzle wall plate 250 is cut-away, e.g. removed, for illustration purposes at cut-lines 302 and 304. Thus, details of unison ring 240 that are covered by nozzle wall plate 250 in an assembled turbine nozzle 210 are displayed in FIG. 3. Turbine nozzle 210, unison ring 240, and nozzle wall plate 250 may be generally annular or ring shaped with an inner circumference and an outer circumference. In one embodiment, turbine nozzle 210, unison ring 240, and nozzle wall plate 250 are coaxial. In one embodiment, the inner circumferences of turbine nozzle 210, unison ring 240, and nozzle wall plate 250 may be the same. In one embodiment, the outer circumferences of turbine nozzle 210, unison ring 240, and nozzle wall plate 250 may be the same.

Nozzle vane 260 may include a stationary vane 310 and a sliding vane 320. In one embodiment, the length of nozzle vane 260 may be adjusted by moving, e.g. sliding, one or both of stationary vane 310 and sliding vane 320 relative to each other. For example, sliding vane 320 may be configured to move and stationary vane 310 may be attached to or integral to the annular nozzle wall plate 250. It may be beneficial to attach stationary vane 310 to nozzle wall plate 250 to reduce or eliminate clearance between stationary vane 310 and nozzle wall plate 250 so aerodynamic losses may be reduced when gas flows past stationary vane 310. Stationary vane 310 may include a sliding surface 312 in sliding contact with a sliding surface 322 of sliding vane 320. In one embodiment, sliding surfaces 312 and 322 may be substantially perpendicular to surface 252 of nozzle wall plate 250. For example, the angle between sliding surface 312 and surface 252 may be between eighty and one hundred degrees. In one embodiment, sliding surfaces 312 and 322 may be parallel and planar.

In one embodiment, sliding vane 320 may be positioned to move as unison ring 240 is rotated. For example, unison ring 240 may be rotated via an actuation arm 340 extending in a radial direction from unison ring 240. Unison ring 240 may include a slot 330 shaped to receive and direct the position of a bearing 350. Bearing 350 may be configured to receive an actuation pin 324 of sliding vane 320. For example, actuation pin 324 may extend from sliding vane 320 through a slot in nozzle wall plate 250 to be received by bearing 350. Thus, sliding vane 320 may be constrained to move within a range determined by the length and position of the slot in nozzle wall plate 250 and the length and position of slot 330.

FIG. 4 shows an exploded view of an example embodiment of a turbine nozzle, which may further illustrate components of turbine nozzle 210, such as slot 410 in nozzle wall plate 250. Slot 410 may be parallel to sliding surfaces 312 and 322. In one embodiment, slot 410 may extend to the outer circumference of nozzle wall plate 250. When turbine nozzle 210 is assembled, slot 410 of nozzle wall plate 250 and slot 330 of unison ring 240 may cross. Actuation pin 324 may extend from sliding vane 320 through nozzle wall plate 250 and unison ring 240 at the cross-point of slots 330 and 410. When unison ring 240 is rotated in a first direction relative to nozzle wall plate 250 about the axis 230, the cross-point may move outward toward the outer circumference of nozzle wall plate 250. Similarly, when unison ring 240 is rotated in the opposite direction relative to nozzle wall plate 250, the cross-point may move inward toward the inner circumference of nozzle wall plate 250. Thus, the position of sliding vane 320 may be adjusted by rotating unison ring 240. For example, in one embodiment, sliding vane 320 may be moved in a general radial direction in turbine nozzle 210. In one embodiment, sliding vane 320 may be moved in a linear direction without pivoting or rotating. In one embodiment, sliding vane 320 may be moved in a linear direction without pivoting or rotating and without moving axially in turbine nozzle 210.

Exhaust flowing through turbine nozzle 210 may include soot and hydrocarbons that may be deposited on sliding surfaces 312 and 322. The deposits can potentially cause increased resistance, or sticking, when moving sliding vane 320. Thus, it may be desirable to reduce or remove the deposits on sliding surfaces 312 and 322 during operation of the engine. For example, the sliding motion of sliding surface 322 against sliding surface 312 may be used to remove the deposits.

In one embodiment, stationary vane 310 may be a first material and sliding vane 320 may be a second material. Further, one or both of the materials may be abrasive. For example, stationary vane 310 may be ceramic or ceramic coated and sliding vane 320 may be steel. As another example, stationary vane 310 may be steel and sliding vane 320 may be ceramic or ceramic coated. Further, one or both of sliding surfaces 312 and 322 may include a texture. For example, a coarse texture on sliding surface 312 may reduce the surface area in contact with sliding surface 322 which may reduce resistance when moving sliding vane 320. Similarly, a first texture or pattern on sliding surface 312 and a second texture or pattern on sliding surface 322 may reduce the resistance when moving sliding vane 320. A textured surface may also rub off soot deposits collected on the textured surface or on the adjacent surface.

Sliding nozzle vane 260 of turbine nozzle 210 may be varied during different engine operating conditions to control the flow of gas through turbine nozzle 210 and the boost pressure of intake manifold 44. Specifically, the flow of gas through turbine nozzle 210 may be controlled by adjusting the length of sliding nozzle vane 260 which may vary the cross-sectional area of channels of turbine nozzle 210. FIGS. 5 and 6 illustrate how the channels of turbine nozzle 210 may be varied by adjusting sliding nozzle vane 260 over a range of lengths. For example, in FIG. 5, sliding nozzle vane 260 may be adjusted to a first length. As another example, the length of sliding nozzle vane 260 may be increased as illustrated in FIG. 6.

Turning to FIG. 5, nozzle vane 260 may be adjusted to length 510. For example, sliding vane 320 may slide in contact with stationary vane 310 along plane 520. In one embodiment, plane 520 may be substantially tangent to an inner circumference 530 of nozzle wall plate 250. For example, plane 520 may be within zero to sixty degrees (e.g., zero to twenty) relative to tangent of inner circumference 530. In one embodiment, nozzle vane 260 may be adjusted to minimum length 510 when sliding vane 320 is adjusted to an end of its range closest to an outer circumference 540 of nozzle wall plate 250.

Channels through turbine nozzle 210 may be formed between adjacent nozzle vanes. For example, a channel may be formed between gas surface 560 of stationary vane 310 and gas surface 570 of sliding vane 320. Gas may be guided by gas surfaces 560 and 570 as gas flows through the channel from a leading edge of nozzle vane 260 toward a trailing edge of nozzle vane 260. The leading edge of nozzle vane 260 may be positioned to face outer circumference 540 and the trailing edge of nozzle vane 260 may be positioned to face inner circumference 530. By orienting each of the nozzle vanes 260 substantially tangent to inner circumference 530 of nozzle wall plate 250, the channel may be narrowed as gas flows through turbine nozzle 210 from outer circumference 540 to inner circumference 530. Thus, gas may be accelerated as the gas flows from outer circumference 540 to inner circumference 530. For example, gas may be accelerated as it flows through the channel to a narrow point of the channel, having a width 550.

Further, the efficiency of turbine 16 may be determined by the incident angle of gas flowing across turbine blade 222. For example, it may be beneficial for gas to exit turbine nozzle 210 and flow across the turbine blades at an incident angle substantially perpendicular to turbine blade 222 and substantially tangential to the inner circumference 530. The incident angle may be determined by the geometry of the channel. For example, the shape and orientation of gas surface 560 of stationary vane 310 and gas surface 570 of sliding vane 320 may affect the incident angle of gas flowing across turbine blade 222. In one embodiment, stationary vane 310 may be attached to turbine nozzle 210 and the geometry of gas surface 560 may be unchanging when the length of nozzle vane 260 is adjusted. Thus, gas flowing near gas surface 560 of stationary vane 310 may be guided toward turbine blade 222 with less variation than when compared to a swing nozzle vane turbine. This may have the potential advantage of increasing turbine efficiency over a wider operating range than when compared to a swing nozzle vane turbine.

The geometry of the channels of turbine nozzle 210 may be varied by lengthening nozzle vane 260. FIG. 6 shows nozzle vane 260 adjusted to a length 610 that is greater than length 510. For example, unison ring 240 may be rotated to move sliding vane 320 in contact with stationary vane 310 along plane 520. In one embodiment, nozzle vane 260 may be lengthened by moving sliding vane 320 toward inner circumference 530 of nozzle wall plate 250. In this manner, the narrow part of the channel between adjacent nozzle vanes, e.g. between gas surfaces 560 and 570, may be further narrowed so that width 620 is less than width 550. Thus, the cross-sectional area of the channel may be reduced by increasing the length of nozzle vane 260.

Further, the incident angle of gas flowing across turbine blade 222 at a first length of nozzle vane 260 may be similar to the incident angle of gas flowing across turbine blade 222 at a different length of nozzle vane 260. For example, the geometry of gas surface 560 may be unchanging when the length of nozzle vane 260 is adjusted. Further, the shape of gas surface 570 of sliding vane 320 may be unchanged. However, as nozzle vane 260 is lengthened, sliding surfaces 312 and 322 may further guide gas through the channels of turbine nozzle 210. In one embodiment, a tapered leading edge of sliding vane 320 and a tapered trailing edge of stationary vane 310 may potentially reduce a difference in incident angles as nozzle vane 260 is adjusted in length.

FIG. 7 further illustrates aspects of nozzle vane 260 that may affect aerodynamic properties of turbine nozzle 210. FIG. 7 shows an example embodiment of nozzle vane 260 so that various vane characteristics may be defined. Nozzle vane 260 may include a rounded leading edge 702 and a tapered trailing edge 704. A chord 710 having a length may extend between leading edge 702 and trailing edge 704. Chord 710 may form an angle 712 with plane 520 at the interface of sliding surface 312 of stationary vane 310 and sliding surface 322 of sliding vane 320. In one embodiment, angle 712 may be within plus or minus 45 degrees.

Nozzle vane 260 includes sliding vane 320. Turbine nozzle 210 is configured so gas surface 570 forms at least a portion of one side of a channel for passing gas through turbine nozzle 210. The aerodynamic flow through the channel and the efficiency of the turbine may be affected by the shape of sliding vane 320. As depicted, sliding vane 320 includes a planar sliding surface 322, a convex curved gas surface 570, a concaved or convex gas surface 560, a length 732, and a maximum thickness 730.

Gas surfaces 560 and 570 may be curved or have other suitable geometries. For example, gas surfaces 560 and 570 may trace an arc with a single axis of curvature. As another example, the gas surfaces may include a convex and a concave portion as far as the flow passage converges along flow direction. As another example, gas surface may include one or more planar faces. For example, sliding vane 320 may be wedge shaped with a narrow end near leading edge 702 and a thick end near trailing edge 704.

Sliding vane 320 may include a tapered end near leading edge 702, and a tapered end near trailing edge 704.

Nozzle vane 260 includes stationary vane 310. Turbine nozzle 210 is configured so gas surface 560 forms at least a portion of one side of a channel for passing gas through turbine nozzle 210. The aerodynamic flow through the channel and the efficiency of the turbine may be affected by the shape of stationary vane 310. As depicted, stationary vane 310 includes a planar sliding surface 312, a gas surface 560, and a maximum thickness 750.

Stationary vane 310 may include a rounded end near leading edge 702, and a tapered end near trailing edge 704. For example, gas surface 560 may include a curved portion intersecting the leading edge of sliding surface 312. Further, gas surface 560 may intersect the trailing edge of gas surface 570 at an angle 760. In one embodiment, angle 760 may be between zero and sixty degrees. In alternate embodiments, other suitable geometries may be used for stationary vane 310. For example, stationary vane 310 may include a tapered end near leading edge 702.

In one embodiment, nozzle vane 260 may be adjusted by moving sliding vane 320 in contact with stationary vane 310 along plane 520. In this manner, nozzle vane 260 may be adjusted between a minimum length and a maximum length. FIG. 7 illustrates an embodiment of nozzle vane 260 at a minimum length when sliding vane 320 is adjusted to a position closest to leading edge 702. At the other end of the spectrum, FIG. 8 illustrates an embodiment of nozzle vane 260 at a maximum length when sliding vane 320 is adjusted to a position farthest from leading edge 702. For example, the leading edge of sliding vane 320 may be adjusted over a range 810. In one embodiment, the travel range 810 may be less than fifty percent along sliding surface 312.

Sliding nozzle vane 260 of turbine nozzle 210 may be varied over range 810 in response to different engine operating conditions. For example, it may be desirable to adjust the amount of boost pressure to the engine during different engine operating conditions. By adjusting the length of sliding nozzle vane 260, the flow of gas through turbine nozzle 210 may be varied and the boost pressure of intake manifold 44 may be adjusted. FIG. 9 shows an example embodiment of a method 900 for a turbocharged engine including a sliding nozzle vane.

At 910, engine operating conditions may be determined. For example, engine load, engine speed, boost pressure, intake air mass flow, turbocharger speed, and exhaust temperature may be measured or calculated. In one example, these conditions may be used to determine if turbocharger 13 should be adjusted. For example, it may be beneficial to operate compressor 14 in a range between surge and choke. Surge may occur during low air mass flow, when the air flow through compressor 14 stalls and may reverse. The reversal of air flow may cause the engine to lose power. Choke occurs when the air flow mass flowing through the compressor cannot be increased for a given speed of the compressor. During choke, the compressor cannot provide additional air to the engine, and so the engine power output density cannot be increased. As one example, it may be desirable to change the nozzle vane geometry to change the energy extracted from the turbine to meet the compressor energy requirement for boost due to different EGR requirements or transient response requirements. As another example, it may be desirable to increase boost pressure by increasing the speed of turbine 16 when compressor 14 is operating near choke.

Further, input from the proportional pedal position signal, PPS, may be monitored. For example, vehicle operator 72 may request an acceleration or deceleration via the accelerator pedal. During acceleration, it may be desirable to increase boost pressure. During deceleration, it may be desirable to decrease boost pressure.

At 920, it is determined if increased boost pressure is desired. If increased boost pressure is not desired, method 900 continues at 950. If increased boost pressure is desired, it may be beneficial to increase the speed of turbine 16 by adjusting the shape of nozzle vane 260. Method 900 continues at 930 when increased boost pressure is desired.

At 930, it is determined if nozzle vane 260 is at its maximum length. For example, it may be determined whether the leading edge of sliding vane 320 is at the end of range 810 farthest from leading edge 702. If nozzle vane 260 is at its maximum length, then the length cannot be increased further, and method 900 continues at 980. However, if nozzle vane 260 is not at its maximum length, method 900 continues at 940.

At 940, the shape of nozzle vane 260 may be adjusted to potentially increase the speed of turbine 16. For example, the length of nozzle vane 260 may be increased which may decrease the cross-sectional area of channel in turbine nozzle 210 and increase the volumetric flow rate of gas through turbine nozzle 210. In one example, nozzle vane 260 may be lengthened by moving sliding vane 320 away from leading edge 702 toward inner circumference 530 of turbine nozzle 210. In this manner, the speed of turbine 16 may potentially be increased. Method 900 may end after 940.

At 950, it is determined if decreased boost pressure is desired. If decreased boost pressure is not desired, method 900 continues at 980. If decreased boost pressure is desired, it may be beneficial to decrease the speed of turbine 16 by adjusting the shape of nozzle vane 260. Method 900 continues at 960 when decreased boost pressure is desired.

At 960, it is determined if nozzle vane 260 is at its minimum length. For example, it may be determined whether the leading edge of sliding vane 320 is at the end of range 810 closest to leading edge 702. If nozzle vane 260 is at its minimum length, then the length cannot be decreased further, and method 900 continues at 980. However, if nozzle vane 260 is not at its minimum length, method 900 continues at 970.

At 970, the shape of nozzle vane 260 may be adjusted to potentially decrease the speed of turbine 16. For example, the length of nozzle vane 260 may be decreased which may increase the cross-sectional area of channel in turbine nozzle 210 and decrease the volumetric flow rate of gas through turbine nozzle 210. In one example, nozzle vane 260 may be shortened by moving sliding vane 320 toward leading edge 702 away from inner circumference 530 of turbine nozzle 210. In this manner, the speed of turbine 16 may potentially be decreased. Method 900 may end after 970.

At 980, the shape of nozzle vane 260 is maintained. For example, the length of nozzle vane 260 is maintained. Method 900 may end after 980.

Thus, method 900 illustrates a method for a turbocharger, such as turbocharger 13. In one example, method 900 comprises routing gas from exhaust passage 204 through turbine nozzle 210 to turbine wheel 220. A shape of nozzle vane 260 of the turbine nozzle 210 may be adjusted in response to an engine operating condition. In this manner, the speed of turbine 16 and the boost pressure may be controlled.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, gasoline, diesel and other engine types and fuel types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. An annular turbine nozzle comprising:
   a nozzle vane including:
      a stationary vane attached to a surface of a nozzle wall plate and including a first sliding surface; and
      a sliding vane including a second sliding surface in contact with the first sliding surface, the sliding vane arranged outside of the stationary vane relative to a central axis of the turbine nozzle and positioned to slide in a direction substantially tangent to an inner circumference of the turbine nozzle, the first and second sliding surfaces perpendicular to the nozzle wall plate surface, the sliding vane including an actuation pin extending through a slot in the nozzle wall plate and attached to a unison ring, the unison ring coaxial with the nozzle wall plate.

2. The turbine nozzle of claim 1, wherein the sliding vane travels in a direction between zero and sixty degrees relative to tangential of the inner circumference to change a throat area of a gas flow passage and wherein the inner circumference of the turbine nozzle is interior to the sliding vane and stationary vane.

3. The turbine nozzle of claim 1, wherein the stationary vane includes a leading edge facing an outer circumference of the turbine nozzle, wherein the stationary vane includes a gas surface facing the inner circumference of the turbine nozzle, and wherein the sliding vane includes a gas surface facing the outer circumference of the turbine nozzle.

4. The turbine nozzle of claim 1, wherein the stationary vane includes a tapered trailing edge facing the inner circumference of the turbine nozzle and wherein rotation of the unison ring moves the sliding vane in the direction substantially tangent to the inner circumference of the turbine nozzle.

5. The turbine nozzle of claim 1, wherein the nozzle vane includes a chord extending between a leading edge of the nozzle vane and a trailing edge of the nozzle vane and a travel distance of the sliding vane is between zero and fifty percent of the second sliding surface of the sliding vane.

6. The turbine nozzle of claim 1, wherein one or both of the second sliding surface of the sliding vane and the first sliding surface of the stationary vane are textured with one of a pattern or coarse texture.

7. The turbine nozzle of claim 1, wherein the sliding vane is a first material and the stationary vane is a second material, the first material different from the second material.

8. The turbine nozzle of claim 5, wherein the first sliding surface of the stationary vane forms an angle with the chord of 60 degrees.

9. The turbine nozzle of claim 7, wherein one of the first material and the second material is ceramic or ceramic coated.

10. A method of adjusting a turbocharger turbine, comprising:
routing gas from an exhaust passage through a turbine nozzle to a turbine wheel, the turbine nozzle and turbine wheel sharing a central axis, the turbine nozzle including a stationary vane coupled to a surface of a nozzle wall plate; and
adjusting a shape of a nozzle vane of the turbine nozzle by sliding a sliding vane of the nozzle vane in a general radial direction in the turbine nozzle in response to an engine operating condition, a first sliding surface of the sliding vane in contact with a second sliding surface of the stationary vane, both the first and second sliding surfaces perpendicular to the surface of the nozzle wall plate, the sliding vane arranged outside of the stationary vane relative to the central axis, the sliding vane including an actuation pin extending through a slot in the nozzle wall plate and attached to a unison ring, the unison ring coaxial with the nozzle wall plate.

11. The method of claim 10, wherein adjusting the shape of the nozzle vane includes lengthening the nozzle vane in the general radial direction, wherein the stationary vane includes a gas surface facing an inner circumference of the turbine nozzle, and wherein the sliding vane includes a gas surface facing an outer circumference of the turbine nozzle, the sliding vane and the stationary vane positioned between the inner and outer circumferences of the turbine nozzle.

12. The method of claim 10, wherein adjusting the shape of the nozzle vane includes shortening the nozzle vane.

13. The method of claim 11, further comprising increasing a speed of the turbine by lengthening the nozzle vane.

14. The method of claim 11, wherein lengthening the nozzle vane includes sliding the sliding vane of the nozzle vane away from a leading edge of the nozzle vane.

15. The method of claim 12, wherein shortening the nozzle vane includes sliding the sliding vane of the nozzle vane toward a leading edge of the nozzle vane.

16. The turbine nozzle of claim 12, further comprising decreasing a speed of the turbine by shortening the nozzle vane.

17. A turbocharger for an engine, comprising:
a turbine wheel having an axis of rotation;
an annular nozzle wall plate concentric with the turbine wheel, the nozzle wall plate including a stationary vane and a slot;
a sliding vane including an actuation pin configured to extend through the slot of the nozzle wall plate;
a bearing configured to receive the actuation pin of the sliding vane; and
a unison ring coaxial with the nozzle wall plate, the unison ring including a slot configured to receive the bearing and to move the sliding vane in a direction substantially tangent to an inner circumference of the nozzle wall plate, the sliding vane in sliding contact with the stationary vane through a first sliding surface of the sliding vane and a second sliding surface of the stationary vane, when one or both of the unison ring and the nozzle wall plate are rotated, both the first sliding surface of the sliding vane and the second sliding surface of the stationary vane perpendicular to a surface of the nozzle wall plate.

18. The turbocharger of claim 17, wherein the stationary vane of the nozzle wall plate is ceramic or ceramic coated.

19. The turbocharger of claim 17, wherein the first sliding surface of the sliding vane, the second sliding surface of the stationary vane, and the surface of the nozzle wall plate are planar surfaces and wherein both the first sliding surface of the sliding vane and the second sliding surface of the stationary vane are perpendicular to the surface of the nozzle wall plate.

20. The turbocharger of claim 17, wherein the second sliding surface of the stationary vane has a first texture in sliding contact with the first sliding surface of the sliding vane, the first sliding surface of the sliding vane having a second texture.

* * * * *